Figure 4:
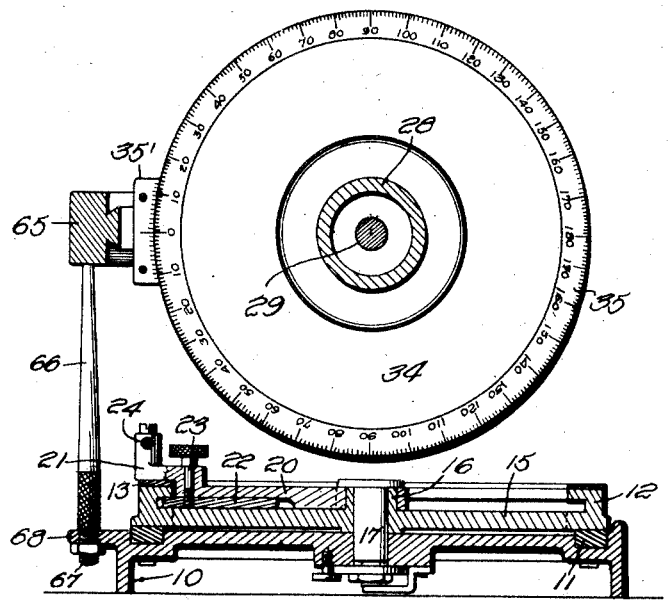

Feb. 16, 1932.  E. J. WILLIS  1,845,860
NAVIGATING INSTRUMENT
Filed July 24, 1930   5 Sheets-Sheet 1
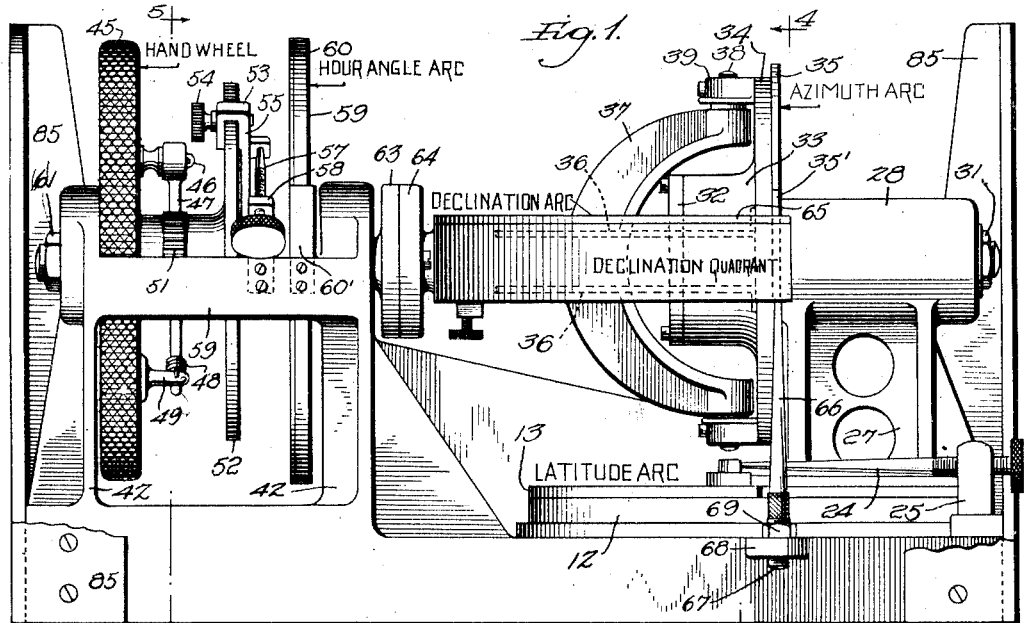

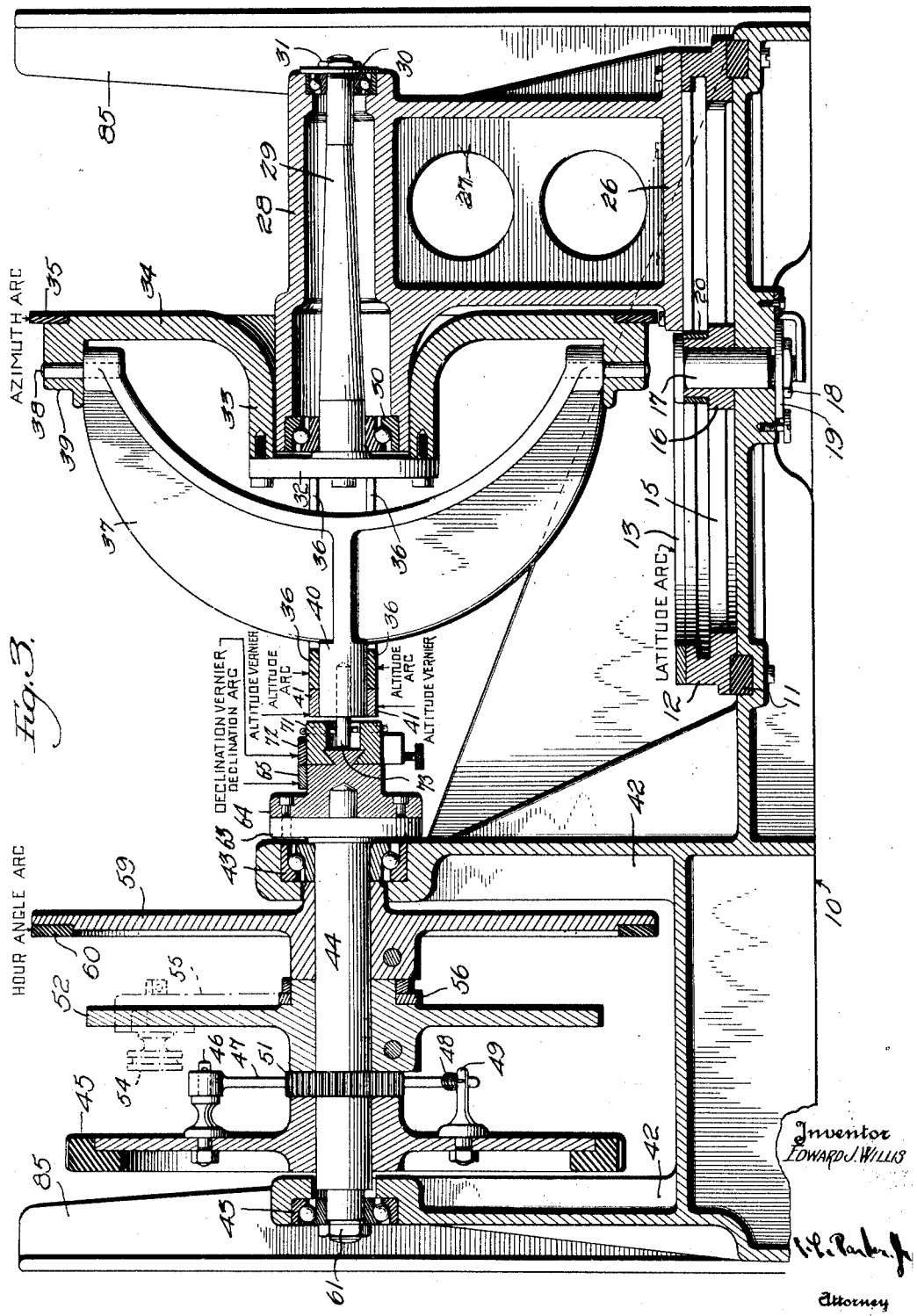

Feb. 16, 1932.  E. J. WILLIS  1,845,860
NAVIGATING INSTRUMENT
Filed July 24, 1930   5 Sheets-Sheet 3

Inventor
EDWARD J. WILLIS

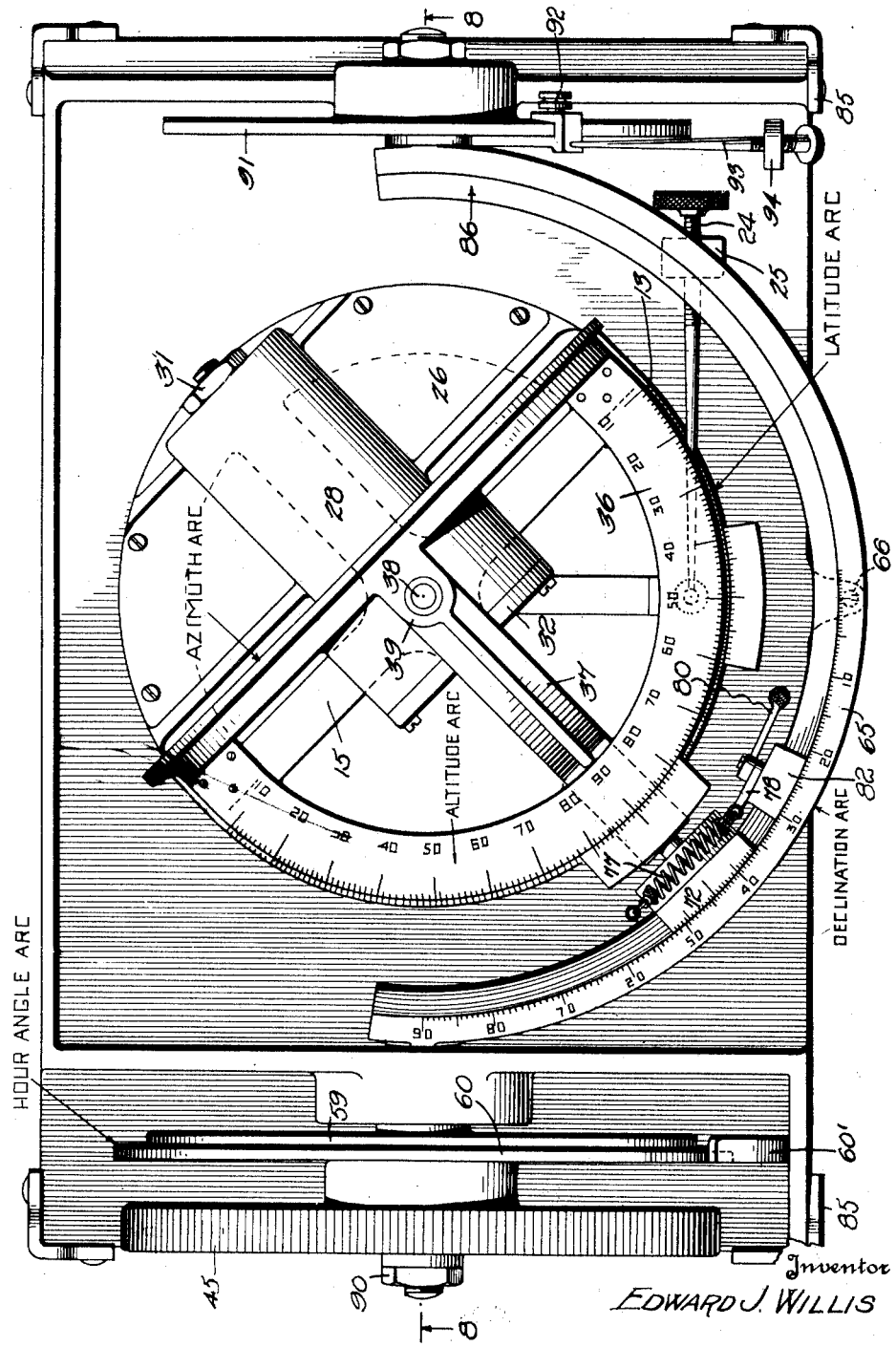

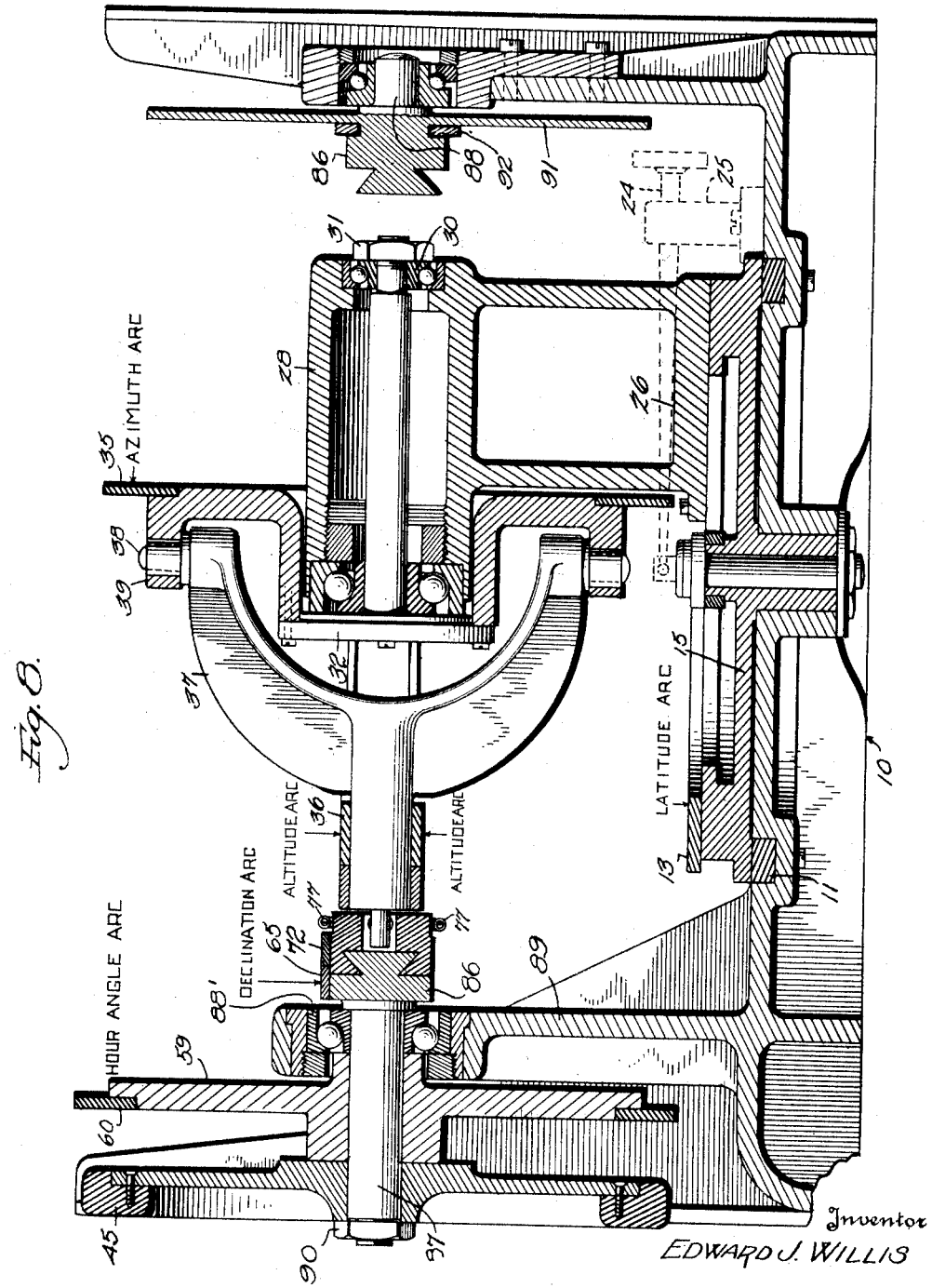

Patented Feb. 16, 1932

1,845,860

UNITED STATES PATENT OFFICE

EDWARD JONES WILLIS, OF RICHMOND, VIRGINIA

NAVIGATING INSTRUMENT

Application filed July 24, 1930. Serial No. 470,488.

This invention relates to navigating instruments.

As is well known, the determination of his line of position is a problem which constantly confronts the navigator. According to the methods generally employed, the drawing of the navigator's line of position involves the calculation of the altitude and azimuth of the celestial body from the dead-reckoned position (St. Hillaire or Sumner Method), or the calculation of the hour-angle and azimuth of the celestial body from the dead-reckoned position ("time-sight" method).

Altitude and azimuth are obtained from the declination of the celestial body, the dead-reckoned latitude and the dead-reckoned hour-angle. Hour-angle and azimuth are obtained from the declination of the heavenly body, the dead-reckoned latitude and the observed altitude of the celestial body. In any case, the present practice of determining the two desired items involves either the use of higher mathematics and somewhat difficult calculations, or the use of extensive and complicated tables.

In an attempt to obviate the difficulties involved in determining the two desired items, many types of instruments have been proposed and produced whereby the two unknown items may be obtained from the three known items. So far as I am aware however, none of these instruments has come into extended use due to inherent disadvantageous features. Most of these instruments are designed to solve spherical triangles, and are therefore difficult to set up and operate, and many instruments of this nature are of such a mechanical construction that results cannot be relied upon as being sufficiently accurate.

The principal object of the present invention is to provide an accurate instrument capable of being easily set up and readily and simply operated, and with which, from the knowledge of any three of the factors altitude, hour-angle, latitude, declination and azimuth, the other two factors are simultaneously obtained by a simple mechanical operation of the instrument and without the necessity of using tables and calculations. In short, it is the primary purpose of this invention to provide an instrument which will do for the navigator exactly what the adding machine does for the bookkeeper, viz, simply, quickly and accurately give unknown factors upon the setting up of the instrument according to known factors.

A further important object of the invention is to provide an instrument of the character referred to which is inherently accurate in its operation, due largely to its features of mechanical construction wherein rigidity of the various parts is obtained together with easy and substantially frictionless movement of the coacting elements.

Although I have determined the invention a "navigating instrument", it more properly might be determined a "navigating machine", according to present day usage. In certain situations, and with some difficulty, the instrument may be made to solve spherical triangles, although it is not intended as a mechanical solver of spherical triangles, since navigation may be accomplished through the use of the instrument by a navigator who has no knowledge of spherical triangles. In fact, the invention is primarily intended for use by this type of navigator. It is a machine, which on operating a hand wheel or the like gives simultaneous values of hour-angle, altitude and azimuth for any heavenly body, from any geographical location. If desired, the instrument also may be used to determine latitude and declination.

The operation of my instrument is based on the principle that a revolution about an axis through the observer's position and parallel to the earth's axis produces exactly the same effect as if the revolution were (as it really is) about the earth's own axis so far as altitude and azimuth are concerned. In the preferred embodiment of my machine, I reproduce the five important items of navigation, namely, latitude, hour-angle, declination, altitude and azimuth by five calibrated arcs which are adapted to partake of rotary motion about their axes and which are so connected that all five axes will continuously and simultaneously intersect at a single point, which is the observer's position.

Regardless of the size, shape and location of the arcs, the machine will function as desired providing the hour-angle arc and axis are at all times respectively perpendicular to the declination arc and axis, the latitude arc and axis respectively perpendicular to hour-angle arc and axis, the azimuth arc and axis respectively perpendicular to the latitude arc and axis, and the altitude arc and axis respectively perpendicular to the azimuth arc and axis. By this arrangement, the altitude arc and the declination arc are parallel on both meridians.

Figure 5:
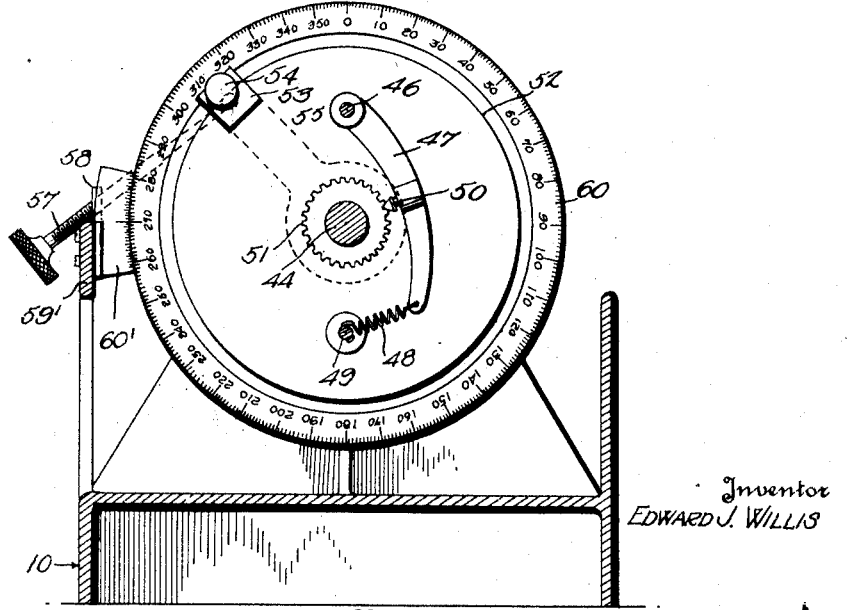

In the accompanying drawings I have shown several embodiments of the invention. In this showing, Figure 1 is a side elevation, parts being broken away, Figure 2 is a plan view, Figure 3 is a central vertical sectional view on line 3—3 of Figure 2, Figure 4 is a transverse section on line 4—4 of Figure 1, Figure 5 is a similar view on line 5—5 of Figure 1, Figure 6 is a fragmentary face view of a safety device and associated elements, parts being shown in section, Figure 7 is a plan view of a modified form of instrument, and, Figure 8 is a central vertical sectional view on line 8—8 of Figure 7.

Referring to Figures 1 to 6 inclusive the numeral 10 designates a base casting as a whole in the upper face of which is formed a recess to receive a bearing ring 11. This ring rotatably supports a pedestal plate 12 to the upper face of which is secured a ring 13 calibrated from its center to its ends, from 0° to 90°, as at 14 and 14' to form a latitude arc. The degree of latitude of the observer at the time of an observation is recorded on the latitude arc, and when the latitude and declination at the time of observation have the same signs, the latitude is recorded on the portion 14, while the latitude is recorded on the portion 14' when the latitude and declination have opposite signs. For the purpose of expediency the calibrated portion of the ring 13 is hereinafter referred to as a whole as the latitude arc.

The pedestal plate 12 is connected by spokes 15 to a hub 16 through which passes a pivot bolt 17. This bolt carries a nut 18 at its lower end engaging a disk 19, as shown in Figure 3. The upper part of the hub 16 rotatably supports the inner end of an arm 20 the outer end of which is offset as at 21 (Fig. 4) to extend across the upper face of the ring 13. A clamping plate 22 is arranged beneath the arm 20 and is provided with an opening in which is threaded the lower end of a screw 23 passing upwardly through the arm 20. Rotation of the screw 23 obviously clamps the outer ends of the plate 22 and arm 20 toward each other to engage the pedestal plate 12 and ring 13 to prevent rotation thereof. A tangent screw 24 has its inner end arranged in a socket in the free end of the arm 20 and is threaded through a support 25 carried by the base 10. Rotation of the tangent screw 24 when the screw 23 is tightened down provides a micrometer adjustment for the latitude arc 13.

A plate 26 (Fig. 3) is bolted against the upper face of the ring 12 and is provided with an upstanding pedestal 27 carrying a horizontal bearing housing 28 at its upper end. The housing 28 receives a spindle 29, turning about a horizontal axis and ball bearings indicated as a whole by the numeral 30 are arranged in opposite ends of the housing 28. A nut 31 on the smaller end of the spindle permits all end play of the spindle to be removed, thus assisting in preventing inaccuracy in operation. It will be noted that the axis of the spindle 29 is perpendicular to and intersects the axis of rotation of the latitude arc.

The inner end of the spindle 29 carries a plate 32 secured to a hub 33, preferably formed integral with an annular member 34. This member carries a ring 35 the periphery of which is preferably calibrated to provide two portions each having graduations from 0° to 180°, as shown in Figure 4. The ring 35 is hereinafter termed the azimuth arc, since the angle of azimuth is recorded thereon. A vernier 35' is provided for the azimuth arc.

A pair of semi-circular members 36 have their ends rigidly secured to the annular member 34. Each semi-circular member 36 is calibrated from its outer ends toward its center from 0° to 90°. The outer faces of both members 36 are similarly calibrated for convenience in reading in the operation of the device. The members 36 are termed the altitude arcs, since the altitude of the observed body is indicated on these arcs. The altitude arcs are mounted with respect to the azimuth arc 35 so that the axes of the arcs are perpendicular to and intersect each other and the axis of the latitude arc at a common point.

A yoke 37 is pivotally connected as at 38 to projections 39 carried by the annular member 34, and the yoke rotates inside the altitude arcs 36. As shown, the axis of the arcs 36 passes through the axis of the pivots 38 of the yoke 37. The yoke is provided with an extending arm 40, which is termed the altitude index, since it carries verniers 41 from which the altitude of the observed body is read. A pair of supporting frames 42 extend upwardly from the left end of the base 10, as viewed in Figure 3. The members 42 carry ball bearings indicated as a whole by the numeral 43 to rotatably support a shaft 44. Adjacent one end of the shaft 44 is mounted a hand wheel 45 operative for rotating the shaft 44. A pin 46, carried by the hand wheel, pivotally supports the upper end of an arm 47, the free end of which is normally urged inwardly toward the shaft 44 by a spring 48 having one end connected to the arm 47 and the other end connected to the hand wheel as at 49. Intermediate its ends, the arm 47 carries a tooth 50 engageable with the teeth of a wheel 51 rigidly connected to the shaft 44. The engagement between the tooth 50 and wheel 51 transmits turning movement between hand wheel and its shaft 44, provided the latter is not locked against rotation, and accordingly, it will be apparent that forced rotation of the wheel 45 under such conditions permits the tooth 50 to escape over the teeth of the wheel 51 to prevent damaging the apparatus.

A clamp plate 52 is carried by the shaft 44. A clamp 53 has portions arranged on opposite sides of the plate 52 and tightly engageable therewith upon operation of the screw 54. The clamp 53 is carried by the outer end of an arm 55 the inner end 56 of which is rotatable about the hub of the plate 52. A tangent screw 57 has one end connected to the clamp arm 55 and is threaded through a support 58 carried by a connecting arm 59' extending between the frames 42. Operation of the tangent screw 57 when the screw 54 is tightened obviously provides micrometer adjustment means for the shaft 44.

The shaft 44 carries an annular member 59 to the peripheral portion of which is connected a ring 60. One face of the ring 60 is calibrated from 0° to 360°, as shown in Figure 5. The ring 60 is termed the hour-angle arc, since the hour-angle at a given observation is recorded on the calibrations of the ring. As shown, the axis of rotation of the hour-angle arc is perpendicular to and intersects the axis of rotation of the latitude arc. A vernier 60' is provided for the hour-angle arc.

In this connection it will be noted that rotation of the hour-angle arc is the rotation which occurs with time, and the hand wheel, when turned, performs the same action relative to change of altitude and azimuth that occurs as a celestial body apparently takes its course through the sky.

As in the case of the spindle 29, it is desired that all lost motion be eliminated from the shaft 44 and accordingly a nut 61 is adapted to take up end play, all radial movement of the shaft being eliminated by the substantial and finely fitted bearing means for the shaft. To assist in the accuracy of the instrument, a counter-weight 62 is carried by the plate 52 for a purpose to be described.

The inner end of the shaft 44 carries a plate 63 to which is secured a second plate 64 supporting a quadrant 65. Obviously the quadrant 65 is rigidly connected to the shaft 44 to rotate therewith. The angle of declination is recorded on the quadrant 65, and accordingly this element is designated as the declination arc. The axis of the declination arc is perpendicular at all times to the axis of rotation of the hour-angle arc. The declination arc is calibrated from its free end toward its inner end from 0° to 90°, as indicated in Figure 2.

In order that the quadrant 65 may be stopped in a position which corresponds to the meridian, or 0° on the hour-angle arc, a stop 66 is secured to the base 10, as shown in Figure 1, and has its upper end arranged in the path of rotation of the quadrant 65 to limit its downward movement. For adjustment purposes, the lower end of the stop 66 is threaded as at 67 in a lug 68 carried by the base 10, and a lock nut 69 is provided for securing the stop in adjusted position corresponding to the meridian, as stated.

As shown in Figures 2, 3 and 6, the declination arc carries an inner guide 70 upon which is slidable a rider 71 carrying a vernier 72 associated with the declination arc. A projecting pin 73 extends into an opening in the rider and is engaged preferably by four pins 74 slidable axially with respect to the pin 73 in guides 75. The pins 74 carry outer heads 76 engageable against the guides 75, as shown in Figure 6. Springs 77 are connected between the heads 76 to urge the pins 74 inwardly against the projecting pins 73. The resilient mounting of the pins 74 is provided in order to prevent the instrument from being strained, and injured should anyone attempt to operate the instrument with any of the clamps improperly locked. Under normal conditions however the pins 74 serve to accurately position the pin 73 with respect to the rider 71. This safety feature is important as is the engagement of the tooth 50 with the wheel 51 since any springing or flexing of the parts is fatal to the accuracy of the instrument.

The rider 71 is connected by a pin 77' to one end of an arm 78. This arm is eccentrically connected as at 79 to an operating lever 80 having concentric pivotal connection 81 with a slide 82. A clamping screw 83 is carried by the slide 82 and is engageable with the declination quadrant to lock the slide against movement. When the slide 82 is locked, movement of the handle 80, through the eccentric 79 permits fine adjustment of the rider 71, and the rider is adapted to be secured to such adjusted position by a clamp screw 84.

As shown in the drawings, suitable verniers and tangent adjustments and clamps are provided for the declination, latitude and hour-angle arcs, but not on the altitude or azimuth arcs, for the verniers of these arcs must be free to move when turning for time with the hand wheel 45.

Corner posts 85 extend upwardly from the base at the corners thereof to protect the parts from injury and also to permit the instrument to stand on either end or side to permit easy reading of the verniers, and the counter-weight 62 (Fig. 2) is provided to compensate for the weight of the declination quadrant 65.

The form of the invention shown in Figures 7 and 8 is quite similar to the form previously described and need not be referred to in detail. The same reference numerals have been used in Figures 7 and 8 to designate parts which correspond to the parts illustrated in the form of the invention already described.

In the modified form of the invention, the use of the single shaft 44 mounted in spaced bearings and connected to a declination quadrant is somewhat changed. In place of this construction, a semi-circular declination arc 86 is employed, this arc being connected at opposite ends to shafts 87 and 88. The hand wheel and hour-angle arc and the elements connected thereto are associated with the shaft 87, and since these elements are substantially identical with the elements previously described, no further description thereof is necessary. The shaft 87 is supported in a ball bearing indicated as a whole by the numeral 88' and supported by the upper end of a frame or pedestal 89. A nut 90 on the outer end of the shaft 87 serves to take up any end play in the shaft as will be apparent.

In place of the clamp plate 52, a similar plate 91 may be carried by the shaft 88, although it will be apparent that the clamp plate my be connected to the shaft 87 if desired. A clamp 92 is associated with the plate 91 and is adapted to be operated by a tangent screw 93 threaded through a supporting lug 94 carried by the base of the instrument.

The operation of both forms of the invention is the same and will be apparent to one skilled in the art. By way of proof of the proper operation of my instrument, it is well known that the five angles commonly used in navigation, viz., declination (D), latitude (L), hour-angle ($t$), altitude (A), and azimuth (Z), are at all times and under all conditions tied together by the following equations:

$$\sin A = \sin D \sin L \pm \cos D \cos L \cos t$$
$$\sin D = \sec A \cos D \sin t$$

In my instrument these factors are similarly tied together at all times by the same two equations. The first of the equations is known as the sine-cosine equation and is given in all books on navigation. The second equation is deducible from the first as will be apparent upon examination of page 29 of my book, "The Methods of Modern Navigation", (D. Van Nostrand Co., New York, 1925). On page 17 of the same book I establish the sine-cosine equation without employing spherical triangles, spherical geometry or spherical trigonometry, and this establishment of the sine-cosine equation is also a mathematical proof that my instrument obeys the laws of the sine-cosine equation.

Since, as explained above, the instrument follows the two equations which are followed in nature, the navigator sets the declination on quadrant 65 by moving the rider 71 to the proper position. As previously stated, the exact positioning of the rider may be accomplished by locking the screw 83, operating the handle 80 by moving it into desired direction, and then clamping the screw 84. The dead-reckoned latitude is then set on the proper latitude arc 14 or 14' by rotating the plate 12 to the proper position. This proper position obviously can be obtained accurately by tightening the screw 23 and operating the tangent screw 24.

The hand wheel 45 is then rotated until the sextant altitude reads on either scale of either of the arcs 36. The clamp screw 54 is then locked in position to prevent rotation of the shaft 44 and the parts carried thereby. When the parts are so locked the navigator then reads the hour-angle on the hour-angle arc 60 and the azimuth on the azimuth arc 35. With these two factors he then draws his line of position in the usual or customary manner.

Instead of operating the machine in the manner just described, the navigator may first set the declination on the declination quadrant 65 (or the arc 86 shown in Figures 7 and 8) and the dead-reckoned latitude on the latitude arc 14 or 14', whereupon the hand wheel 45 may be rotated until the hour-angle arc 60 records the dead-reckoned hour-angle after which the clamp plate 52 is locked in position. The navigator then may read his altitude on either scale of either altitude arc 36, and azimuth on the azimuth arc, after which the line of position on the chart may be drawn in the usual manner.

Regardless of whether the first or second method is employed, the same line of position will be produced. The first method is called the "Time-Sight Method" and the last is called either the "St. Hillaire" or the "Sumner Method". The methods referred to are both now in general use, some navigators using one and some the other, while some navigators use both methods to obtain a check on their work.

The instrument is unquestionably theoretically sound and its extreme accuracy is due largely to structural features. For example, accuracy is obtainable largely through the use of the yoke 37 and its mounting, and in this connection it will be noted that the projecting pin 73 on the index 40 permits the accurate swing of the yoke on the turret head or member 34 and associated elements. The pin 73 and associated elements also permits the yoke to swivel freely and accurately with respect to the rider 71.

The instrument provides in effect two lathes with their spindles 29 and 44 (or the spindle 29 and shaft 87 illustrated in Figures 7 and 8) set in accurate ball bearings having no lost motion, and with both spindles parallel to the base. The angle at which the two axes intersect each other obviously is determined by the latitude. The rotation of the spindle 29 represents the change in azimuth, while the rotation of the shaft 44 represents the change in hour-angle which occurs with time. The means for connecting the two lathe spindles is the yoke 37, index 40 and pin 73. The angle at which this connection is made is determined by the position of the turret head (represented by the housing 28 and elements associated therewith) with respect to the declination arc. The movement occurring with the turn of the hand wheel, which is the action of time, simultaneously and automatically moves the altitude vernier and the azimuth arc to their proper places without any adjustment whatsoever and with no friction or danger of locking. It is largely these features which make the instrument operative, practical and useful.

It is to be understood that the forms of the invention herewith shown and described are to be taken as preferred examples of the same and that various changes in the shape, size and arrangement of parts may be made without departing from the spirit of the invention or the scope of the subjoined claims.

I claim:

1. A navigating instrument comprising five rotatable calibrated arcs representing respectively altitude, latitude, azimuth, declination and hour-angle, said arcs being so mounted with respect to each other that the five axes of rotation at all times intersect at a common point which corresponds to the position of the observer, shafts rotatably mounted to define the axes of rotation of the azimuth and hour-angle arcs, said latitude arc having its axis perpendicular to the axis of rotation of the shaft of said azimuth arc, the shaft of said azimuth arc being arranged in a common plane with the other shaft and rotatable in such plane, said latitude arc being connected to said last named shaft to rotate therewith, verniers for the altitude and declination arcs, and a swivel connection between said verniers to cause them to move together and to freely assume angular positions with respect to each other according to the angular positions of said altitude and declination arcs with respect to each other.

2. A navigating instrument comprising five rotatable calibrated arcs having verniers associated therewith and representing respectively altitude, latitude, azimuth, declination and hour-angle, said arcs being so mounted with respect to each other that the five axes of rotation at all times intersect at a common point which corresponds to the position of the observer, shafts rotatably mounted to define the axes of rotation of the azimuth and hour-angle arcs, said latitude arc having its axis perpendicular to the axis of rotation of the shaft of said azimuth arc, the shaft of said azimuth arc being arranged in a common plane with the other shaft and rotatable with said latitude arc in said plane, means for clamping said latitude and hour-angle arcs against rotation, and a swivel connection between the verniers of the altitude and declination arcs to permit such verniers to move together and to freely assume angular positions with respect to each other according to the angular positions of said altitude and declination arcs with respect to each other.

3. A navigating instrument comprising five rotatable calibrated arcs having verniers associated therewith and representing respectively altitude, latitude, azimuth, declination and hour-angle, said arcs being so mounted with respect to each other that the five axes of rotation at all times intersect at a common point which corresponds to the position of the observer, shafts rotatably mounted to define the axes of rotation of the azimuth and hour angle arcs, said shafts being arranged in a common plane perpendicular to the axis of rotation of said latitude arc, bearing means for said shafts, the bearing means for the shaft of said azimuth arc being connected to said latitude arc to rotate therewith, said altitude arc being rigidly connected to said azimuth arc, and means for pivotally connecting the vernier of said altitude arc to said azimuth arc to swing about an axis perpendicular to said altitude arc.

4. A navigating instrument comprising five rotatable calibrated arcs having verniers associated therewith and representing respectively altitude, latitude, azimuth, declination and hour-angle, said arcs being so mounted with respect to each other that the five axes of rotation at all times intersect at a common point which corresponds to the position of the observer, shafts arranged in a common plane and rotatably supporting said azimuth and hour-angle arcs, bearing means for said shafts, said latitude arc having its axis perpendicular to said plane and being connected with the bearing means for said azimuth arc, said altitude arc being rigidly connected to said azimuth arc, a yoke pivotally connected to said azimuth arc on an axis perpendicular to said altitude arc and carrying the vernier for said altitude arc, and a swivel connection between the verniers of said altitude and declination arcs.

5. A navigating instrument comprising five rotatable calibrated arcs having verniers associated therewith and representing respectively altitude, latitude, azimuth, declination and hour-angle, said arcs being so mounted with respect to each other that the five axes of rotation at all times intersect at a common point which corresponds to the position of the observer, the axes of said azimuth and hour-angle arcs lying in a common plane, said declination arc being rotatable with said hour angle arc about the axis of the latter, and a swivel conection between the verniers of the altitude and declination arcs to cause such verniers to move simultaneously and to permit them to assume different angles with respect to each other according to the respective angles of the altitude and declination arcs.

6. A navigating instrument comprising five rotatable calibrated arcs having verniers associated therewith and representing respectively altitude, latitude, azimuth, declination and hour-angle, said arcs being so mounted with respect to each other that the five axes of rotation at all times intersect at a common point which corresponds to the position of the observer, the axes of said azimuth and hour-angle arcs lying in a common plane, said declination arc being rotatable with said hour angle arc about the axis of the latter, a rider slidable along said declination arc and carrying the vernier thereof, an index for said altitude arc carrying the vernier thereof, and a swivel connection between said index and said rider to cause them to move together and to permit the verniers of said altitude and declination arcs to freely assume different angles according to the relative angularity of said altitude and declination arcs.

7. A navigating instrument comprising five rotatable calibrated arcs having verniers associated therewith and representing respectively altitude, latitude, azimuth, declination and hour-angle, said arcs being so mounted with respect to each other that the five axes of rotation at all times intersect at a common point which corresponds to the position of the observer, the axes of said azimuth and hour-angle arcs lying in a common plane, said declination arc being rotatable with said hour-angle arc about the axis of the latter, a rider slidable along said declination arc and carrying the vernier thereof, an index for said altitude arc carrying the vernier thereof, said rider being provided with an opening, a pin carried by said index and extending loosely into said opening, and a plurality of spring pressed pins extending through said rider radially with respect to and contacting with said first named pin.

8. A navigating instrument comprising five rotatable calibrated arcs representing respectively altitude, latitude, azimuth, declination and hour-angle, said arcs being so mounted with respect to each other that the five axes of rotation at all times intersect at a common point which corresponds to the position of the observer, shafts supporting said azimuth and hour-angle arcs for rotation about their axes, said shafts having their axes arranged in a common plane perpendicular to the axis of said latitude arc, means connecting the shaft of said azimuth arc to said latitude arc whereby said last named shaft is adapted to revolve with said latitude arc, a hand wheel mounted on the shaft of said hour-angle arc, and a resiliently engaged clutch connecting said hand wheel to the shaft of said hour angle arc.

In testimony whereof I affix my signature.

EDWARD JONES WILLIS.